(12) United States Patent
Ferrar

(10) Patent No.: US 7,594,870 B2
(45) Date of Patent: Sep. 29, 2009

(54) VARIABLE SPEED RATIO TRANSMISSION

(76) Inventor: Philip T. Ferrar, 244 Monroe Mill Dr., Ballwin, MO (US) 26263

( * ) Notice: Subject to any disclaimer, the term of this patent is extended or adjusted under 35 U.S.C. 154(b) by 987 days.

(21) Appl. No.: 11/154,441

(22) Filed: Jun. 16, 2005

(65) Prior Publication Data

US 2006/0287153 A1 Dec. 21, 2006

(51) Int. Cl.
*F16H 1/32* (2006.01)

(52) U.S. Cl. .................. 475/166; 475/164; 475/169

(58) Field of Classification Search ............ 475/163, 475/164, 165, 166, 169, 180, 185, 186; 74/665 GA, 74/665 GB, 665 GC, 665 GD; 476/36, 38, 476/47

See application file for complete search history.

(56) References Cited

U.S. PATENT DOCUMENTS

| | | |
|---|---|---|
| 168,912 A | 10/1875 | Mead |
| 312,171 A | 2/1885 | Shaw |
| 457,100 A | 8/1891 | Yates |
| 533,912 A | 2/1895 | Moise |
| 658,743 A | 9/1900 | Trautvetter |
| 782,043 A | 2/1905 | McCready-Weench |
| 900,111 A | 10/1908 | Milion |
| 1,083,328 A | 1/1914 | Kitchen-Storey |
| 1,141,508 A | 6/1915 | Weiss |
| 1,146,982 A | 7/1915 | Turner |
| 1,182,778 A | 5/1916 | Learning |
| 1,207,216 A | 12/1916 | Roberts |
| 1,222,712 A | 4/1917 | Armstrong |
| 1,281,448 A | 10/1918 | Wendler |
| 1,340,759 A | 5/1920 | Duncan |
| 1,410,722 A | 3/1922 | Rogers |
| 1,452,946 A | 4/1923 | Weiss |
| 1,489,521 A | 4/1924 | Conrad |
| 1,489,802 A | 4/1924 | Turner |
| 1,541,882 A | 6/1925 | Weiss |
| 1,728,383 A | 9/1929 | Weiss |
| 1,826,408 A | 10/1931 | Tenney |
| 1,854,586 A | 4/1932 | Hyer |
| 2,020,123 A * | 11/1935 | Pollard .................. 74/63 |
| 2,092,437 A | 9/1937 | Weiss |
| 2,230,627 A | 2/1941 | Sachse |
| 2,482,415 A | 9/1949 | Hilton et al. |
| 2,490,525 A | 12/1949 | Koller |
| 2,496,871 A | 2/1950 | Griffin |
| 2,682,776 A | 7/1954 | Morgan |
| 2,826,285 A | 3/1958 | Salomon |
| 2,949,791 A | 8/1960 | Cattaneo |

(Continued)

*Primary Examiner*—David D. Le
(74) *Attorney, Agent, or Firm*—Senniger Powers LLP

(57) ABSTRACT

A variable speed ratio transmission including a drive element having a spherical frictional engagement surface centered on a primary axis, a carrier having a roller axle orbiting the primary transmission axis spaced from the spherical surface by a predetermined distance, and a roller rotatably and slidably mounted on the roller axle. The roller axle is angled with respect to a tangent of the spherical engagement surface so the roller tends to slide axially along the roller axle toward the frictional engagement surface to frictionally engage the engagement surface when a relative motion between the drive element and the carrier is in an engaging drive direction and to slide axially along the roller axle away from the frictional engagement surface of the drive element to disengage the engagement surface when the relative motion between the drive element and the carrier is in a disengaging drive direction opposite the engaging direction.

14 Claims, 6 Drawing Sheets

U.S. PATENT DOCUMENTS

| | | |
|---|---|---|
| 2,959,971 A | 11/1960 | Salomon |
| 3,034,365 A | 5/1962 | Stieber |
| 3,076,347 A | 2/1963 | Grant |
| 3,170,550 A | 2/1965 | Hausman |
| 3,800,607 A | 4/1974 | Zurcher |
| 3,826,157 A | 7/1974 | Stoll |
| RE29,328 E * | 8/1977 | Kemper .................... 475/115 |
| 4,112,781 A | 9/1978 | Baugh |
| 4,147,072 A | 4/1979 | Mullins |
| 4,487,086 A * | 12/1984 | Broziat ..................... 476/9 |
| 4,700,581 A | 10/1987 | Tibbals et al. |
| 4,819,494 A | 4/1989 | Giuliani et al. |
| 5,318,486 A | 6/1994 | Lutz |
| 5,597,056 A | 1/1997 | Blake |
| 5,626,354 A | 5/1997 | Elliott |
| 5,660,077 A | 8/1997 | Nekola |
| 5,662,197 A | 9/1997 | Tabe |
| 6,089,115 A | 7/2000 | Yoshioka |

* cited by examiner

US 7,594,870 B2

VARIABLE SPEED RATIO TRANSMISSION

BACKGROUND OF THE INVENTION

The present invention relates generally to a transmission, and more particularly to a variable speed ratio transmission for transmitting rotational motion from an input to an output at an infinite number of speed ratios within a predetermined range of speed ratios.

Transmissions are commonly used to transmit rotational motions from an input to an output at a variety of speed ratios. Although most transmissions are operable at fixed discrete speed ratios, some conventional transmissions are infinitely variable over a range of speed ratios. Such infinitely variable transmissions are operable at any speed ratio between a minimum speed ratio and a maximum speed ratio. However, most of these conventional infinitely variable transmissions do not permit the speed ratio to be changed while the input and the output are standing still. As a result, when the required input torque becomes too great for the power source providing the torque to the input, the power source may stall and cease powering the transmission. If the transmission is mounted in a vehicle and the speed ratio is set too high so the required input torque is too high for the power source to turn the input, the power source may stall and the vehicle will become immobile. If the speed ratio cannot be changed while the transmission is standing still, the required input torque cannot be adjusted downward thereby preventing the vehicle from overcoming its immobility. Accordingly, a need exists for an infinitely variable transmission that permits the speed ratio to be changed while the input and output are not turning.

Internal parts in some infinitely variable transmissions become worn early in the transmission life. If these worn parts are responsible for transmitting torque from the input to the output, the torque that can be transmitted without slippage is often reduced as the parts wear. As a result, some variable speed transmissions may require early maintenance and/or part replacement so they can adequately transmit torque. In many instances early maintenance or part replacement make infinitely variable transmissions non-viable. Therefore, a need exists for an infinitely variable transmission that automatically adjusts its operation as it wears so it is operable for extended periods of time without slippage or maintenance.

SUMMARY OF THE INVENTION

Briefly, the present invention includes a variable speed ratio transmission for transmitting rotational motion from an input to an output at a multiplicity of speed ratios within a predetermined range of speed ratios. The transmission comprises a drive element having a spherical frictional engagement surface centered on a primary axis of the transmission. The transmission also includes a carrier having at least one roller axle orbiting the primary transmission axis spaced from the spherical surface of the drive element by a predetermined distance, and a roller rotatably and slidably mounted on the roller axle so that the roller is free to rotate about and slide along the roller axle. The roller axle is angled with respect to a tangent of the spherical engagement surface of the drive element so that the roller tends to slide axially along the roller axle toward the frictional engagement surface of the drive element to frictionally engage the engagement surface when a relative motion between the drive element and the carrier is in an engaging drive direction and to slide axially along the roller axle away from the frictional engagement surface of the drive element to disengage the engagement surface when the relative motion between the drive element and the carrier is in a disengaging drive direction opposite the engaging direction.

In another aspect, the invention includes a variable speed ratio transmission for transmitting rotational motion from an input to an output at a multiplicity of speed ratios within a predetermined range of speed ratios. The transmission comprises a main axle extending along a primary axis of the transmission and a transverse axle extending laterally with respect to the primary axis of the transmission. The transmission also includes a drive element rotatably mounted on the main axle having an internal spherical frictional engagement surface centered on the primary axis of the transmission. In addition, the transmission includes a carrier mounted on the transverse axle for rotation about the primary axis of the transmission and for pivotal motion about the transverse axle. The carrier has at least one roller rotatably mounted thereon for rotation about a roller axis that orbits about the primary transmission axis as the carrier rotates about the primary axis of the transmission to carry the roller along an orbital path spaced from the spherical surface of the drive element by a predetermined distance.

In yet another aspect, the invention includes a variable speed ratio transmission for transmitting rotational motion from an input to an output at a multiplicity of speed ratios within a predetermined range of speed ratios. The transmission comprises a drive element having an internal spherical frictional engagement surface centered on a primary axis of the transmission and a carrier rotatably mounted inside the frictional engagement surface of the drive element having at least one roller rotatably mounted thereon for rotation about a roller axis that orbits about the primary transmission axis as the carrier rotates to carry the roller along an orbital path spaced from the spherical surface of the drive element by a predetermined distance. The carrier includes gear teeth extending from at least one face thereof. Further, the transmission comprises a first gear having teeth sized and shaped for meshing with the teeth of the carrier. The first gear rotates about an axis extending generally laterally with respect to the primary axis of the transmission. The transmission also includes a second gear mounted inside the gear teeth of the carrier having teeth sized and shaped for meshing with the teeth of the first gear. The second gear rotates about an axis extending generally parallel to the primary axis of the transmission.

In still another aspect, the invention includes a variable speed ratio transmission for transmitting rotational motion from an input to an output at a multiplicity of speed ratios within a predetermined range of speed ratios. The transmission comprises a drive element having an internal spherical frictional engagement surface centered on a primary axis of the transmission and a carrier rotatably mounted inside the frictional engagement surface of the drive element for rotation about the primary axis of the transmission and for pivotal motion about a secondary axis extending lateral to the primary axis. The carrier has at least one roller rotatably mounted thereon for rotation about a roller axis that orbits about the primary transmission axis as the carrier rotates to carry the roller along an orbital path spaced from the spherical surface of the drive element by a predetermined distance. The carrier includes gear teeth extending from at least one face thereof. The transmission also includes a gear shaft having a central axis extending transverse to the primary transmission axis. The shaft is mounted for pivotal movement about the primary axis. In addition, the transmission includes a gear mounted on the gear shaft adapted for rotation about the central axis of the gear shaft having teeth sized and shaped for meshing with the teeth of the carrier. Moreover, the transmission comprises a shifter operatively connected to at least one of the gear shaft and the carrier for pivoting the shaft about the primary axis to a predetermined position and pivoting the carrier about the secondary axis to a selected orientation relative to the primary transmission axis thereby providing a predetermined speed ratio for the transmission.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
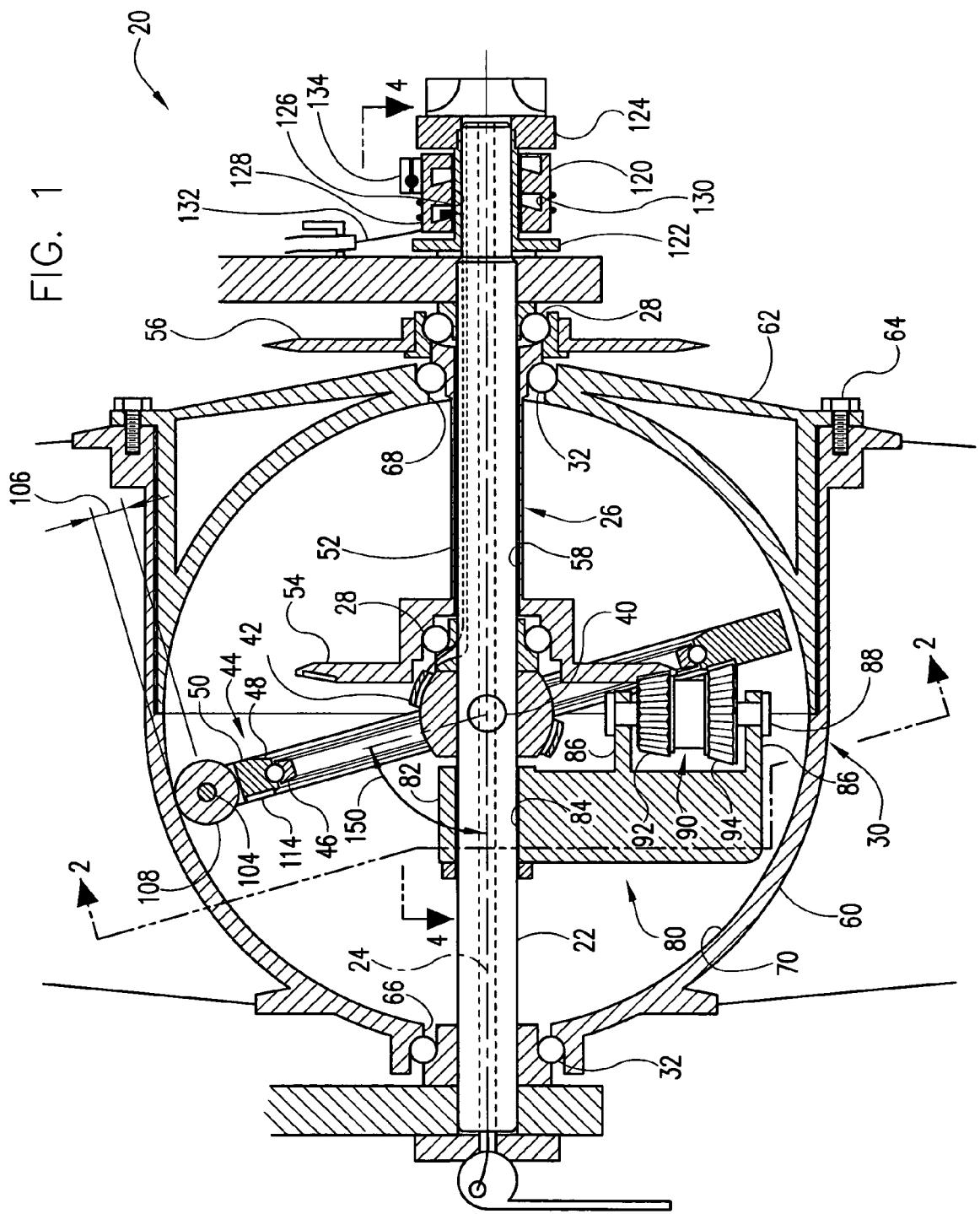
FIG. 1 is a cross section of a transmission of one embodiment of the present invention.
Figure 2:
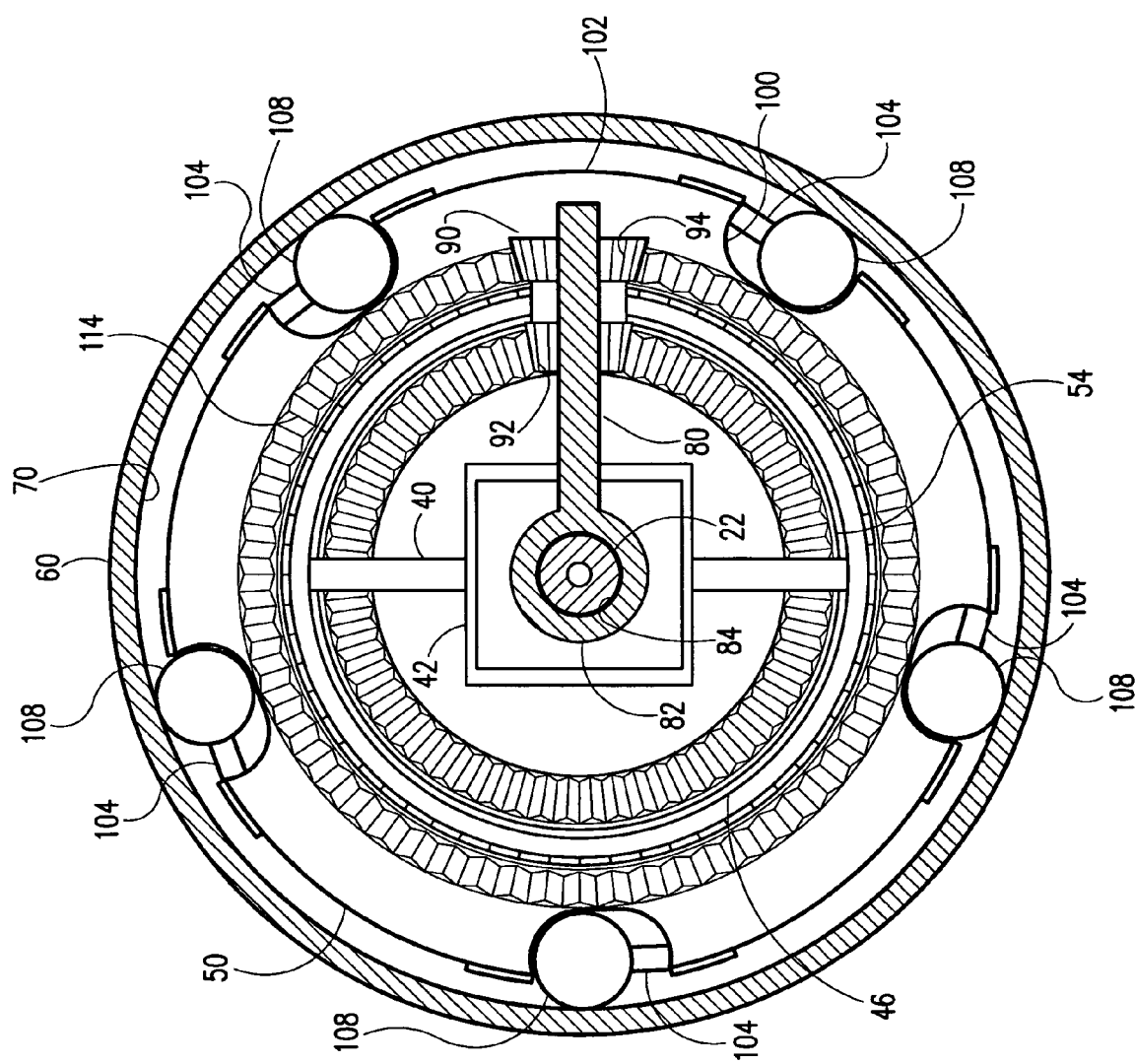
FIG. 2 is an oblique elevation of a carrier of the transmission taken along line 2-2 of FIG. 1.

Referring now to the drawings and in particular to FIG. 1, a variable speed ratio transmission of the present invention is designated in its entirety by the reference numeral 20. The transmission 20 includes a central main axle 22 extending along an imaginary primary axis 24 of the transmission, an input (generally designated by 26) rotatably mounted on the axle by ball bearings 28, and an output (generally designated by 30) rotatably mounted on the main axle and the input by ball bearings 32. As illustrated in FIG. 2, a transverse axle 40 extending laterally with respect to the primary axis 24. The transverse axle 40 includes a yoke 42 at its middle that surrounds the main axle 22. A ball bearing assembly, generally designated by 44, is fixed to the opposite ends of the transverse axle 40. The ball bearing assembly 44 includes an inner race 46 mounted on the transverse axle 40 and an outer race 48 rotatably mounted on the inner race 46 for rotation around the circumference of the inner race. A carrier 50 is mounted on the outer race 48 so it is free to spin about the primary axis 24 of the transmission and rotate with the transverse axle 40.

As shown in FIG. 1, the input 26 includes a central spindle 52 having a bevel gear 54 mounted on one end and a sprocket 56 mounted on an opposite end. The input 26 includes a central opening 58 for receiving the main axle 22. The ball bearings 28 are mounted on the input 26 adjacent the opposite ends of the spindle 52. As the sprocket 56 is driven, for example by a bicycle chain (not shown), the bevel gear 54 at the opposite end of the spindle 54 rotates about the main axle 22 as will be explained in further detail below. The output 30 includes a main section 60 and a cap section 62 fastened to the main section with fasteners 64. Ends of the main section 60 and cap section 62 have openings 66, 68, respectively, for receiving the main axle 22. The ball bearings 32 are mounted on the output 30 adjacent the openings 66, 68 in the main section 60 and cap section 62. The main section 60 and cap section 62 form a drive element having an internal spherical frictional engagement surface 70 centered on the primary axis 24 of the transmission 20.

A gear assembly, generally designated by 80, is rotatably mounted on the main axle 22 adjacent the transverse axle 40. The gear assembly 80 includes a bracket 82 having a hole 84 at one end for receiving the main axle 22. Flanges 86 on the bracket 82 opposite the hole 84 hold a gear shaft 88 extending generally perpendicular to the primary axis 24 of the transmission. A gear, generally designated by 90, having an inner set of bevel gear teeth 92 and an outer set of bevel gear teeth 94, is rotatably mounted on the gear shaft 88. The inner set of gear teeth 92 meshes with teeth on the bevel gear 54 of the input 26. Thus, as the bevel gear 54 turns, it rotates the gear 90 about the gear shaft 88.

Figure 3:
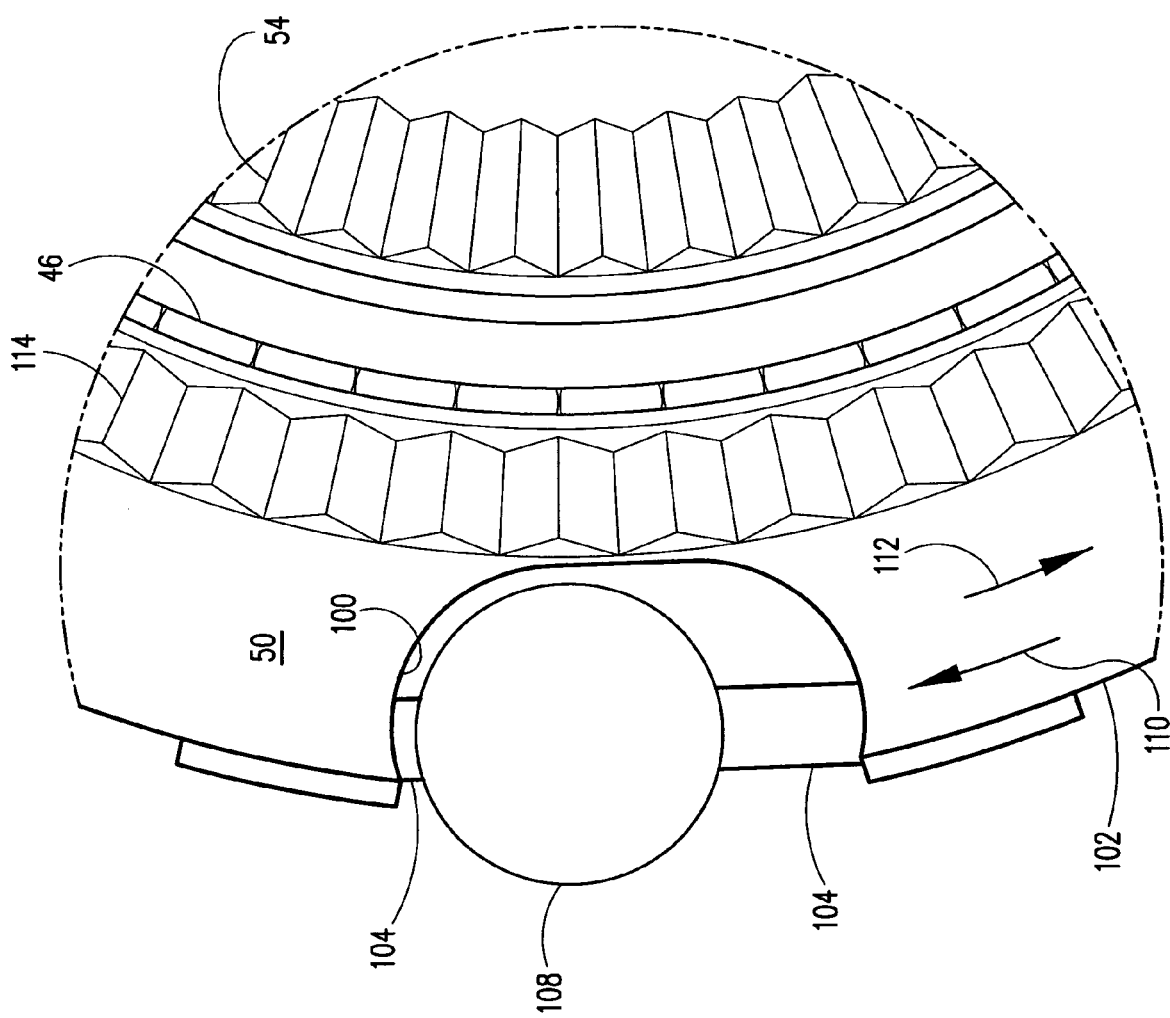
FIG. 3 is a detail of the carrier shown in FIG. 2.

As illustrated in FIG. 3, the carrier 50 is generally circular having openings 100 at its perimeter 102. A roller axle 104 extends across each of the openings 100 in the carrier 50 so the roller axles orbit the primary axis 24 as the carrier rotates about the primary axis. As shown in FIG. 1, each roller axle 104 is spaced from the spherical engagement surface 70 of the output 30 by a generally fixed and predetermined distance 106. A roller 108 is rotatably and slidably mounted on each roller axle 104. As can be appreciated by viewing FIG. 3, each roller 108 is mounted on its respective axle 104 so the roller is free to rotate about and slide along the roller axle. Although the transmission 20 may have other numbers of axle 104 and roller 108 sets without departing from the scope of the present invention, in one embodiment the transmission has five axle and roller sets as shown in FIG. 2. Although the rollers 108 may have other shapes without departing from the scope of the present invention, in one embodiment the rollers are generally spherical. In addition, bushings or bearings (e.g., needle bearings) may be used between each roller 108 and its corresponding axle 104 to reduce friction. As further shown in FIG. 3, each roller axle 104 is angled with respect to a tangent of the spherical engagement surface 70 (FIG. 1) of the output 30 (FIG. 1) so the respective roller 108 tends to slide axially along the roller axle so it moves radially outward from the primary axis 24 of the transmission 20 and toward the frictional engagement surface of the output to frictionally engage the engagement surface the drive element when a relative motion between the output and the carrier 50 is in an engaging drive direction 110. The angle of the roller axle 104 also tends to cause each roller 108 to slide axially along its roller axle so it moves radially inward toward the primary axis 24 of the transmission 20 and away from the frictional engagement surface 70 of the output 30 to disengage the engagement surface when the relative motion between the output 30 and the carrier 50 is in a disengaging drive direction 112 opposite the engaging direction 110. In general, each roller 108 remains in constant contact with the frictional engagement surface of the output 30

The angled axles 104 cause beneficial effects. First, as the rollers 108 and the engagement surface 70 wear, the rollers move along the axles 104 so the rollers maintain adequate frictional engagement with the engagement surface. In this way, the rollers 108 tend to account for the wear, and the transmission 20 is operable for extended periods of time without slippage or maintenance. Second, when the transmission 20 has an engaging drive direction 110 and a disengaging drive direction 112 so the input 26 can remain still as the output 30 continues to turn.

As illustrated in FIG. 2, one face of the carrier 50 includes gear teeth 114 for driving the carrier. The outer set of bevel gear teeth 94 of the gear assembly 80 meshes with the gear teeth 114 of the carrier 50 so the gear assembly drives the carrier as it turns. Although the previously described gears are bevel gears, those skilled in the art will appreciate that the gears may be other types of gears such as complementary combinations of spur gears, face gears, crown gears and ring gears without departing from the scope of the present invention.

Figure 4:
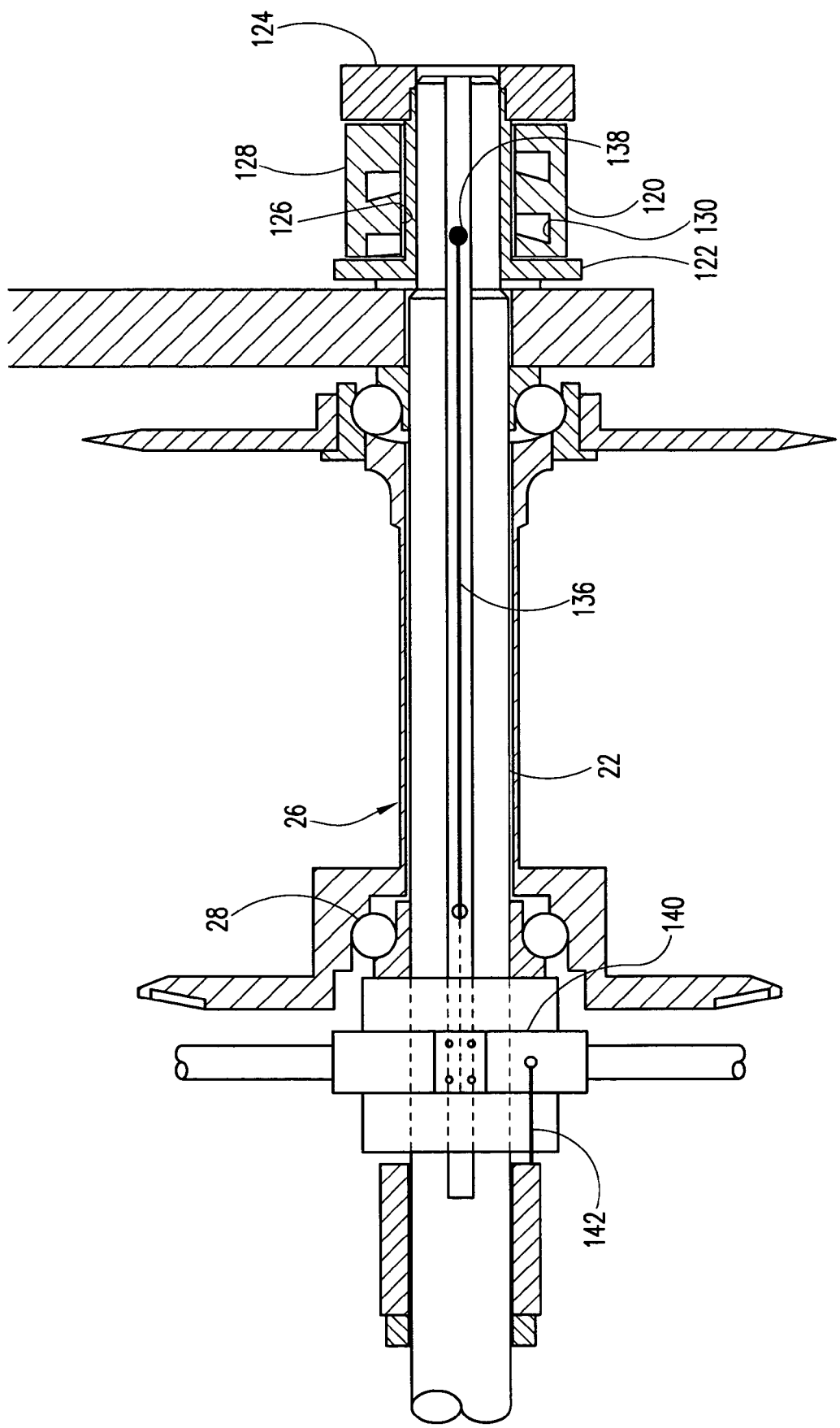
FIG. 4 is a detail of a shifting mechanism taken along line 4-4 in FIG. 1.

As shown in FIG. 4, an annular collar 120 is rotatably mounted on one end of the main axle 22 between washers 122, 124. The collar 120 has an inner surface 126 facing the main axle 22 and an outer surface 128 opposite the inner surface. A helical groove 130 is formed in the inner surface 126 of the collar 120. A shifter cable 132 is wound around the outer surface 128 of the collar 120 and terminated in a clamp 134 so that as shifter cable 132 is pulled and released, the collar rotates back and forth around the main axle 22. A primary linkage 136 having a bead 138 at one end extends between the collar 120 and the yoke 42 at the middle of the transverse axle 40. The bead 138 at the outer end of the primary linkage 136 is positioned in the helical groove 130 of the collar 120 so the primary linkage moves longitudinally as the collar rotates. The end of the primary linkage 136 opposite the bead is clamped to a clamp 140 provided on the yoke 42 of the transverse axle 40 so the carrier 50 rotates with the transverse axle 40 as the collar 120 rotates about the main axle 22. A secondary linkage 142 extends between the yoke 42 and the bracket 82 of the gear assembly 80 so the gear assembly 80 rotates about the main axle 22 as the carrier 50 rotates with the transverse axle 40. The yoke 42 and the bracket 82 include clamps (not shown) for clamping corresponding ends of the secondary linkage 142.

It is envisioned that the components described above may be made of a variety of conventional materials. For example, the components may be made of steel or carbon fiber reinforced resins. It is further envisioned that the surfaces of the rollers 108 and the internal spherical frictional engagement surface 70 of the output 30 may be treated or coated to improve the frictional engagement of these components. Moreover, these components may be made of materials which ensure adequate frictional engagement between the components. Conventional techniques, which will be apparent to those skilled in the art, may be used to make and assemble the components In one embodiment, the transmission 20 of the present invention is operated by driving the sprocket to rotate the input 26 about the main axle 22. As the input 26 turns, the bevel gear 54 rotates the gear 90 mounted on the bracket 82 about the gear shaft 88. The outer set of bevel gear teeth 94 on the gear 90 engage the gear teeth 114 on the carrier 50 to rotate the carrier about the imaginary primary axis 24 of the transmission 20. The rollers 108 on the carrier 50 engage the internal spherical frictional engagement surface 70 of the output 30 to rotate the output about the main axle 22.

As will be appreciated by those skilled in the art, the angle 150 (FIG. 1) the carrier 50 makes with the main axle 22 determines the speed ratio of the transmission 20. The speed ratio equals the reciprocal of the sine of the angle 150. Thus, the speed ratio of the transmission 20 is changed by changing the angle 150 the carrier 50 makes with the main axle 22 as will be explained below. The transmission 20 transmits rotational motion from the input 26 to the output 30 at an infinite number of speed ratios within a predetermined range of speed ratios. These speed ratios are continuously variable within the range. In one embodiment, the transmission 20 is infinitely variable between a minimum speed ratio of about 1:1 and a maximum speed ratio of about 4:1 or more.

Figure 5:
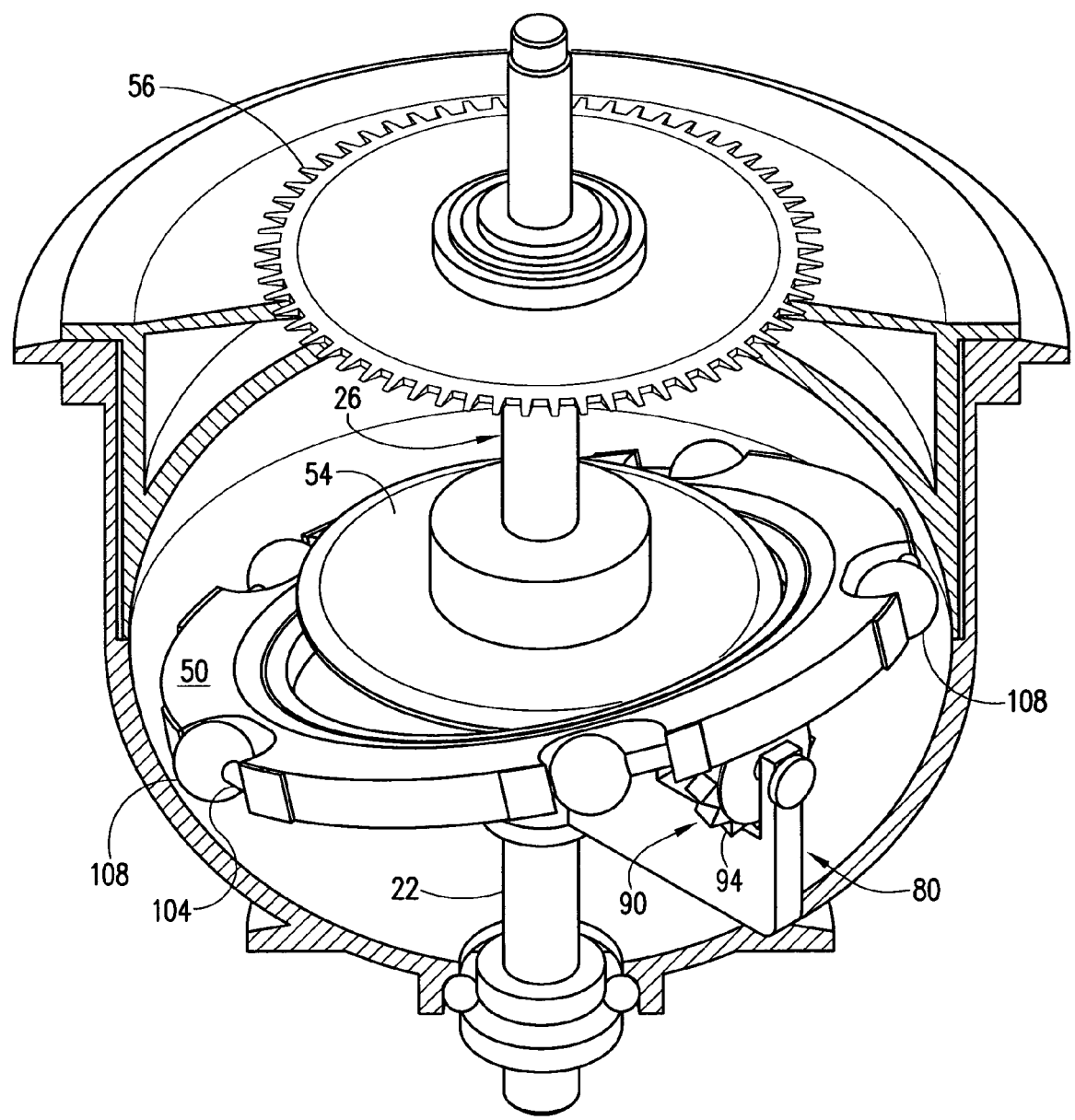
FIG. 5 is a perspective of the carrier of the transmission in a minimum speed ratio position.
Figure 6:
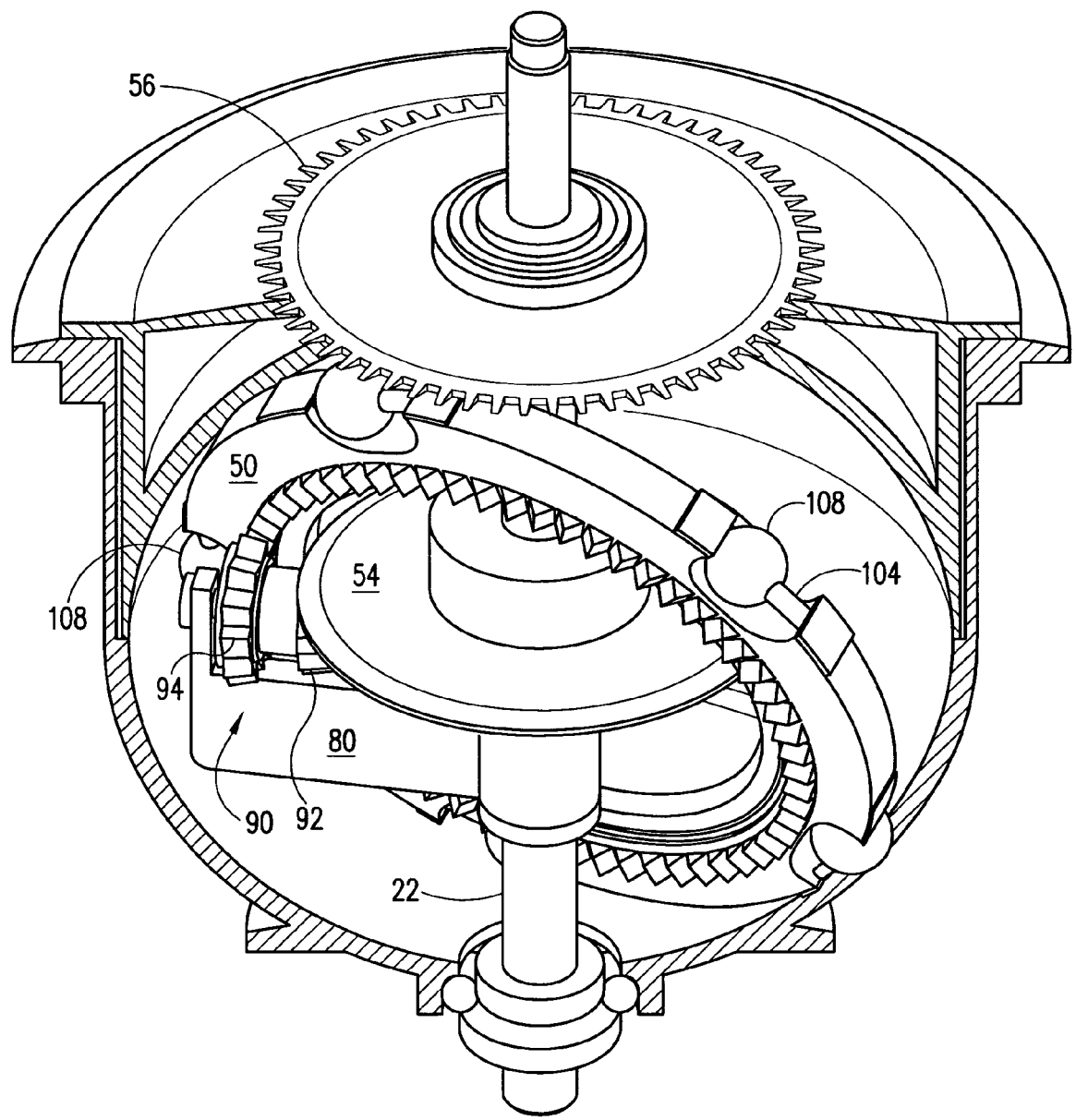
FIG. 6 is a perspective of the carrier of the transmission in a maximum speed ratio position.

The speed ratio of the transmission 20 is changed by pulling or releasing the shifter cable 132 to rotate the collar 120. As the collar 120 turns, the bead 138 on the end of the primary linkage 136 slides along the helical groove 130 so the primary linkage moves longitudinally to rotate the yoke 42. The carrier 50 turns with the yoke 42, and the secondary linkage 142 rotates the gear assembly 80 so the outer set of bevel gear teeth 94 remain engaged with the gear teeth 114 on the carrier 50. In this way, the transmission 20 speed ratio may be varied between a minimum speed ratio position as shown in FIG. 5 and a maximum speed ratio position as shown in FIG. 6. Moreover, any speed ratio between the minimum speed ratio and the maximum speed ratio may be achieved. In other words, the speed ratio is continuously variable between the minimum and the maximum speed ratios.

The gear assembly 80 may be biased to turn in one direction so the primary and secondary linkages 136, 142, respectively, and the shifter cable 132 remain in tension. Because the gear assembly 80 and yoke 42 are connected by the secondary linkage 142, biasing the gear assembly also biases the yoke and carrier in a corresponding direction. When the shifter cable 132 is pulled the carrier 50 pivots in one direction, and when the cable is released the biasing means pivots the carrier in the opposite direction. Although other means for applying a bias to the gear assembly 80 may be used without departing from the scope of the present invention, in one embodiment a spring (not shown) extends between the bracket 82 and the main axle 22. For example, it is envisioned the spring may be a coil spring or a torsion spring without departing from the scope of the present invention.

Although the spherical engagement surface 70 may have other areas without departing from the scope of the present invention, in one embodiment the spherical engagement surface has an area constituting more than about ninety percent of a corresponding sphere. For example, in FIG. 1 only the portions of the output 30 adjacent the bearings 28, 32 are omitted from the sphere. Thus, the spherical engagement surface has an area constituting all of the sphere except for the omitted portions.

As will be appreciated by those skilled in the art, in one embodiment the design of the transmission 20 of the present invention, permits the transmission to "free wheel." When the input 26 stops turning, the output 30 is free to continue turning because the rollers 108 slide along their respective axles 104 and disengage the internal spherical engagement surface 70 of the output. Thus, the transmission 20 of the present invention is particularly suited for use in bicycles where free wheeling is desired to prevent the bicycle crank from turning when the bicycle is coasting. In an alternate embodiment, the roller axle may be designed to prevent free wheeling.

As will further be appreciated by those skilled in the art, the input 26 and output 30 of the transmission 20 of the present invention may be functionally reversed. The output 30 of the transmission 20 may be driven so the carrier 50 drives the input 26. When operated in this mode, the transmission works substantially in reverse to the operation described above. In other words, the input becomes the output and the output becomes the input.

Another advantage of the design of the present invention is that the speed ratio may be adjusted while neither the input 26 nor the output 30 is moving. Because the rollers 108 are mounted on axles 104 that extend parallel to the perimeter 102 of the carrier 50, the carrier is free to pivot to change the speed ratio of the transmission even when neither the input 26 nor the output 30 is moving. In this way, when the power source driving the input 26 is overcome and can no longer turn the input, the operator can shift to a lower speed ratio while the input and output 30 are not turning. The input 26 becomes easier to turn at lower speed ratios. When the gear ratio is changed while the input 26 and the output 30 are not rotating, the gear assembly 80 pivots about the primary axis 24 and the carrier pivots about the transverse axle 40 so bevel gear 54 remains meshed with the gear teeth 114 on the carrier.

Still further, because the axles 104 are angled, as the rollers 108 and the engagement surface 70 wear, the rollers move along the axles so the rollers maintain adequate frictional engagement with the engagement surface. In this way, the rollers self-adjust for wear, so the transmission 20 may be operated for extended periods of time without slippage or maintenance.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A variable speed ratio transmission for transmitting rotational motion from an input to an output at a multiplicity of speed ratios within a predetermined range of speed ratios, said transmission comprising:
    a drive element having a spherical frictional engagement surface centered on a primary axis of the transmission;
    a carrier having at least one roller axle orbiting said primary transmission axis spaced from the spherical surface of the drive element by a predetermined distance; and
    a roller rotatably and slidably mounted on the roller axle so that the roller is free to rotate about and slide along the roller axle,
    wherein the roller axle is angled with respect to a tangent of the spherical engagement surface of the drive element so that the roller tends to slide axially along the roller axle toward the frictional engagement surface of the drive element to frictionally engage the engagement surface when a relative motion between the drive element and the carrier is in an engaging drive direction and to slide axially along the roller axle away from the frictional engagement surface of the drive element to disengage the engagement surface when the relative motion between the drive element and the carrier is in a disengaging drive direction opposite the engaging direction.

2. A transmission as set forth in claim 1 wherein the carrier is generally circular.

3. A transmission in accordance with claim 1 wherein the rollers are generally spherical.

4. A transmission in accordance with claim 1 wherein the carrier includes gear teeth for driving the carrier.

5. A transmission in accordance with claim 1 wherein the rollers are mounted inside the spherical frictional engagement surface of the drive element.

6. A transmission in accordance with claim 1 where in the spherical engagement surface has an area constituting more than about ninety percent of a sphere.

7. A variable speed ratio transmission for transmitting rotational motion from an input to an output at a multiplicity of speed ratios within a predetermined range of speed ratios, said transmission comprising:
    a main axle extending along a primary axis of the transmission;
    a transverse axle extending laterally with respect to the primary axis of the transmission;
    a drive element rotatably mounted on the main axle having an internal spherical frictional engagement surface centered on the primary axis of the transmission; and
    a carrier mounted on the transverse axle for rotation about the primary axis of the transmission and for pivotal motion about the transverse axle, said carrier having at least one roller rotatably mounted thereon for rotation about a roller axis that orbits about the primary transmission axis as the carrier rotates about the primary axis of the transmission to carry the roller along an orbital path spaced from the spherical surface of the drive element by a predetermined distance, wherein one end of the roller axis is spaced farther from the spherical surface than an opposite end.

8. A transmission in accordance with claim 7 wherein the predetermined distance is temporally fixed and varies along the length of the roller axis.

9. A variable speed ratio transmission for transmitting rotational motion from an input to an output at a multiplicity of speed ratios within a predetermined range of speed ratios, said transmission comprising:
    a drive element having an internal spherical frictional engagement surface centered on a primary axis of the transmission;
    a carrier rotatably mounted inside the frictional engagement surface of the drive element having at least one roller rotatably mounted thereon for rotation about a roller axis that orbits about the primary transmission axis as the carrier rotates to carry the roller along an orbital path spaced from the spherical surface of the drive element by a predetermined distance, said carrier including gear teeth extending from at least one face thereof;
    a first gear having teeth sized and shaped for meshing with the teeth of the carrier, said first gear rotating about an axis extending generally laterally with respect to the primary axis of the transmission; and
    a second gear mounted inside the gear teeth of the carrier having teeth sized and shaped for meshing with the teeth of the first gear, said second gear rotating about an axis extending generally parallel to the primary axis of the transmission.

10. A transmission in accordance with claim 9 wherein the first gear comprises a spur gear.

11. A transmission in accordance with claim 10 wherein the second gear comprises a face gear.

12. A transmission in accordance with claim 11 wherein the gear teeth extending from the carrier and the second gear are axially offset along the primary transmission axis.

13. A variable speed ratio transmission for transmission rotational motion from an input to an output at a multiplicity of speed ratios within a predetermined range of speed ratios, said transmission comprising:
    a drive element having an internal spherical friction engagement surface centered on a primary axis of the transmission;
    a carrier rotatably mounted inside the frictional engagement surface of the drive element for rotation about the primary axis of the transmission and for pivotal motion about a secondary axis extending lateral to the primary axis, said carrier having at least one roller rotatably mounted thereon for rotation about a roller axis that orbits about the primary transmission axis as the carrier rotates to carry the roller along an orbital path spaced from the spherical surface of the drive element by a predetermined distance, said carrier including gear teeth extending from at least one face thereof;

a gear shaft having a central axis extending transverse to the primary transmission axis, said shaft being mounted for pivotal movement about the primary axis;

a gear mounted on the gear shaft adapted for rotation about the central axis of the gear shaft having teeth sized and shaped for meshing with the teeth of the carrier; and a shifter operatively connected to at least one of the gear shaft and the carrier for pivoting the shaft about the primary axis to a predetermined position and pivoting the carrier about the secondary axis to a selected orientation relative to the primary transmission axis thereby providing a predetermined speed ratio for the transmission.

14. A transmission in accordance with claim 13 wherein:

the gear shaft is biased to pivot in a first direction; and the shifter comprises a flexible member attached to the shaft and at least partially encircling the main transmission axis such that tension in the flexible member opposes the bias of the shaft so that as the member is pulled the shaft pivots in a direction opposite that in which the shaft is biased and as the member is released the shaft pivots in the same direction as it is biased.

* * * * *